Sept. 24, 1957
C. FARRIS
2,807,474
TANDEM AXLE SUSPENSION
Filed April 27, 1954
2 Sheets-Sheet 1
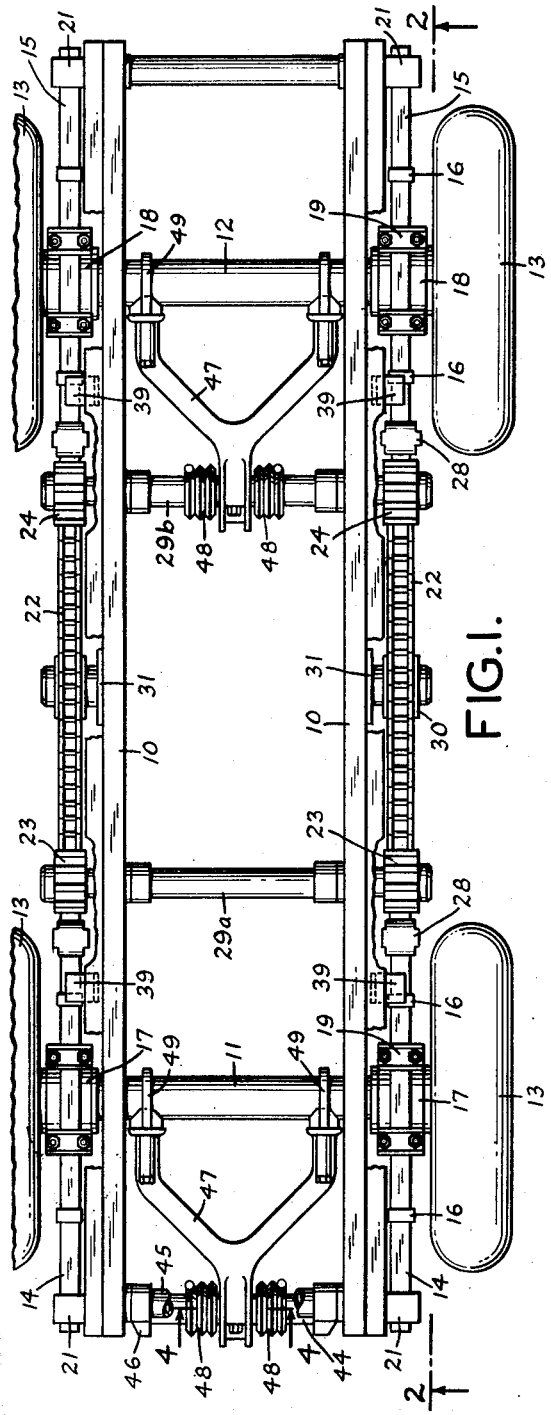
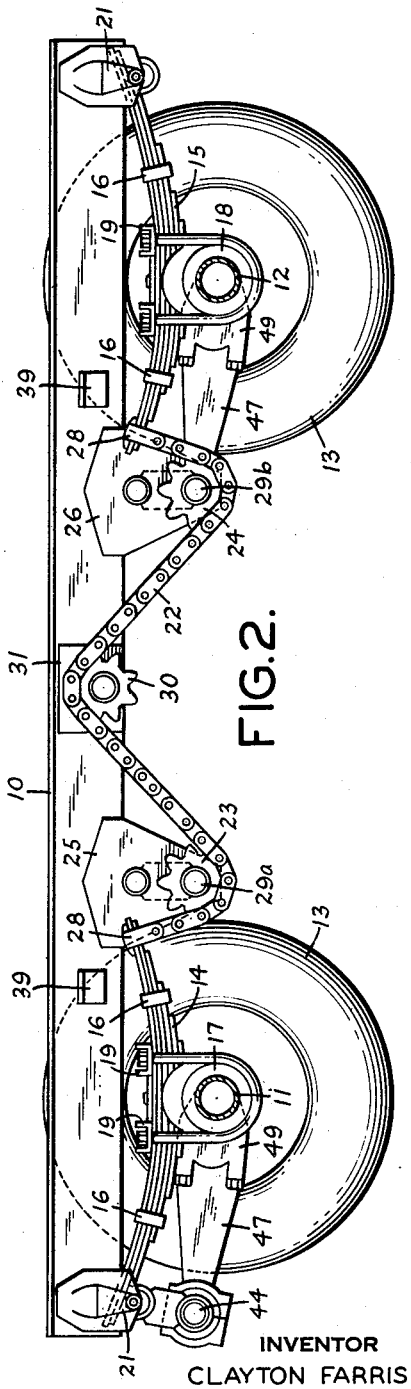
INVENTOR
CLAYTON FARRIS
BY
HIS ATTORNEYS Sept. 24, 1957   C. FARRIS   2,807,474
TANDEM AXLE SUSPENSION
Filed April 27, 1954   2 Sheets-Sheet 2

INVENTOR
CLAYTON FARRIS
BY
HIS ATTORNEYS

United States Patent Office 2,807,474
Patented Sept. 24, 1957

2,807,474
TANDEM AXLE SUSPENSION

Clayton Farris, East Orange, N. J., assignor to The Trucktor Corporation, Westfield, N. J., a corporation of Delaware Application April 27, 1954, Serial No. 425,894

4 Claims. (Cl. 280—104.5)

This invention relates to spring suspensions for supporting the frames of vehicles, and relates particularly to an improved form of spring suspension for load-carrying vehicles, such as trailers, buses, trucks, and the like, having dual tandem axles, either or both of which may be drive axles.

Many different types of spring suspensions for dual rear axle vehicles have been proposed in the past, always with an object of providing maximum accommodation to road bed irregularities, maximum performance under heavy loads and even distribution of the load over a relatively large area. The present invention is especially applicable to a type of spring suspension wherein the frame of the vehicle is suspended by a pair of multileaf type springs associated with each of the two axles, the front ends of the springs of the forward axle and the rear ends of the springs of the trailing axle being attached to the frame for the support thereof, while the oppositely-disposed free ends of the springs on each side of the vehicle are connected by a flexible linkage, which not only contributes to the support of the frame between the axles, but at the same time serves as a load-transmitting medium to distribute the weight between the axles. This type of spring suspension has the advantage of having excellent weight-carrying and shock-absorbing characteristics, and it has further advantages in that it is capable of absorbing sudden torque loads, distributing the weight-load between the axles, and transmitting shifts of weight-loads smoothly from one axle to the other. Of particular importance to the present invention, however, is the fact that this type of suspension is readily adapted to designs which call for increased distances between the tandem axles.

Today most states have laws which provide maximum weight-loads per axle, and in many of these states the maximum permissible weight-loads per axle are greater if the axles are spaced further apart. Obviously, it is desirable to obtain the advantage of the additional carrying capacity if it can be done without adding too much to the cost or weight of the unit.

The present invention is directed primarily to a spring suspension for tandem axles, wherein the axles are capable of being spaced appreciable distances apart to take advantage of the added load-carrying capacity permitted by state laws, without detracting from the standard performance of the spring suspension and without appreciably increasing the cost or weight of the unit. This object is accomplished generally by increasing the distances between the axles and their respective spring assemblies, and by providing means for additionally supporting the frame between the spring assemblies, while still making possible the distribution of the weight-load between the axles and the smooth transmission of shifts of weight loads from one axle to the other.

The spring suspension of the present invention also includes provision for achieving tracking action of the wheels whereby the axles and frame are connected in a floating relationship to facilitate road alignment, turns, etc., but sufficient centering pressure is applied to the axles for straight-ahead driving.

These and other features of the present invention will be more fully understood by reference to the detailed description which follows and to the accompanying drawings in which:

Fig. 1 is a top plan view of the frame supporting spring suspension of a heavy-load carrying vehicle equipped with the present invention, the details of the power drive transmission being omitted;

Fig. 2 is a side elevation view taken substantially along the line 2—2 of Fig. 1, looking in the direction of the arrows;

Figure 3:
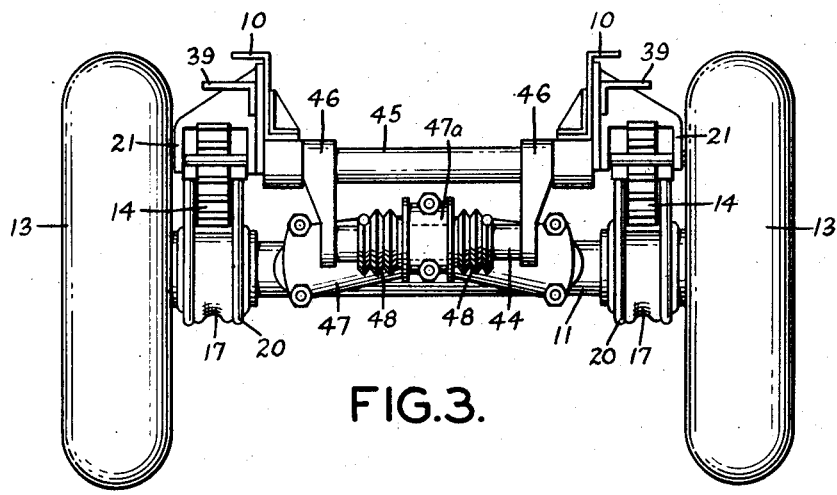
Fig. 3 is a front end view of Figs. 1 and 2.

Referring to Fig. 1 of the drawing, one embodiment of the present improved suspension for supporting a vehicle frame 10 on a pair of axles 11, 12 is shown, the axle 11 being the leading axle and the axle 12 being the trailing axle. The axles are each adapted to carry road wheels 13 at their extreme ends. In this suspension, either the front or the rear axle or both may be driven by means of suitable drive shafts, universal joints and differential systems as required, the drive transmission and structure therefor forming no part of the present invention. When used on trailers, however, neither of the axles will be driven.

The vehicle frame 10 is adapted to be supported above the leading axle 11 by a pair of multileaf springs 14, one on each side of the frame, and above the trailing axle 12 by a pair of multileaf springs 15, one on each side of the frame. These springs are mounted just outboard of the outer sides of the frame 10. The elements of each spring are fastened together by bands 16.

The base of each of the front multileaf springs 14 seats more or less centrally upon an axle housing 17 of the leading axle 11, and similarly the base of each of the rear springs 15 seats more or less centrally upon an axle housing 18 of the trailing axle 12. The springs 14, 15 are securely fastened to the respective axle housings 17, 18 by clamps or saddles 19 which engage the tops of the springs and U-shaped clips 20 which attach the saddles to the axle housings. Rubber bushings 11a, 12a surround the axles 11, 12.

On each side of the vehicle, the extreme front ends of the springs 14 and the extreme back ends of the springs 15, that is to say, the slipper ends, are attached directly to the frame 10 by shackles or slipper brackets 21, or by cushion blocks or the like, and so serve to support the frame 10. The back ends of the springs 14 and the front ends of the springs 15 are not themselves attached directly to the frame, but are connected, on each side of the vehicle, by flexible link chains 22 which contribute to the support of the frame by means of the structure about to be described. The ends of the chain 22 may be attached to the oppositely disposed free ends of the springs 14, 15 by means of suitable fasteners 28.

Each side of the frame 10 is provided with a pair of rotatable sprocket wheels 23, 24 suspended from the side of the frame by downwardly depending brackets 25, 26, respectively. Preferably the sprocket wheel 23 is spaced just behind and somewhat below the free rearward end of the spring 14, and the sprocket wheel 24 spaced just ahead and somewhat below the free forward end of the spring 15. The sprocket wheels 23, 24 may be supported at the ends of transverse shafts or cross supports 29a, 29b, respectively. The links of the chains 22 are adapted to pass around beneath and engage the teeth of both sprocket wheels 23, 24, thereby lending additional support to the frame 10 through the brackets 25, 26. With this type of arrangement, it is evident that the axles 11, 12 may be spaced apart a substantial distance and at the same time provide the necessary support for the frame without adding too much to the weight or cost of the unit.

In order to maintain the chain in engagement with the sprocket wheels 23, 24 and to eliminate the possibility of the chain jumping off the teeth thereof, an intermediate rotatable sprocket wheel 30 may be mounted to each side of the frame 10 by means of a bracket 31. The sprocket wheel 30 may be located substantially midway between the sprocket wheels 23, 24 and slightly higher, so that the connecting chain 22 passes around beneath the wheels 23, 24 and over the sprocket wheel 30, following substantially a W-shaped path between the springs 14, 15.

As a safety precaution in the event one of the chains 22 snaps, outwardly disposed flanges 39 may be mounted to the sides of the frame 10 above the free ends of the springs 14, 15.

Figure 5:
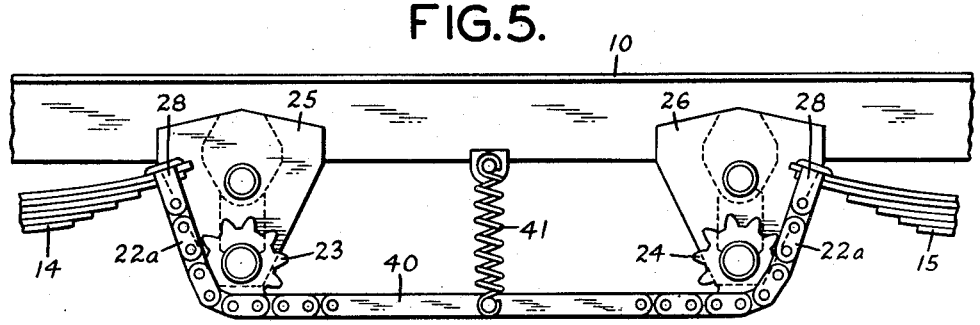
Fig. 5 is a side view, similar to Fig. 2, illustrating an alternative embodiment of the present invention.

Fig. 5 shows an alternative arrangement of the present invention wherein a long bar or link 40 is interposed midway in the chain connection, separating the chain into two equal lengths 22a. A tension spring 41 connects the middle of the bar 40 with the frame 10, the tension of the spring serving to keep the chain under constant tension against the sprocket wheels to prevent the chain from jumping off the sprocket wheels. This arrangement may even result in a possible decrease in both the cost and weight of the unit.

Figure 4:
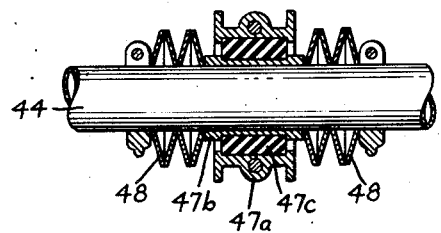
Fig. 4 is a cross-section view taken along the line 4—4 of Fig. 1, looking in the direction of the arrows.

To provide tracking action for the wheels of the leading and trailing axles, provision is made for allowing a limited degree of angular and axial displacement of the axles 11, 12 with respect to the frame 10. Accordingly, as best shown in Figs. 1 and 3, a short shaft 44 is hung beneath the forward cross shaft 45 of the frame 10 and is supported therefrom at both ends by brackets 46. A yoke member 47 connects the shaft 44 and the axle 11, the head 47a of the yoke being mounted to the shaft 44 and the split end of the yoke being mounted to the axle 11. The forward head 47a of the yoke is provided with a bearing sleeve 47b (see Fig. 4) which is slidable on the shaft 44 between oppositely disposed Belleville springs or washers 48, the action of the springs 48 tending to center the yoke sleeve on the shaft. A rubber yoke head insulator 47c is interposed between the yoke head 47a and the sleeve 47b.

The rearwardly disposed split arms of the yoke are attached to the axle 11 by the yoke connections 49. In the similar fashion, the trailing axle 12 is connected by a yoke 47 to the shaft or cross support 29b.

The springs 14, 15 by themselves would permit considerable freedom and displacement of the axles 11, 12, however, satisfactory tracking action is achieved by the slidable effect of the yoke head 47a which is permitted to float in accordance with road alignment and turns, but has sufficient pressure exerted thereon by the Belleville springs 48 to center the axles on straight-ahead operation.

From the preceding description, it will be apparent that the spring suspension embodying the present invention provides an arrangement which makes possible considerable separation between dual tandem axles of vehicles of the type above described without sacrificing roadability, so that the greatest possible advantage can be taken of state laws which permit heavier loads to be carried by vehicles wherein the axles are spaced further apart, and at the same time keeping the complexity, weight and cost of the spring suspension at a minimum.

While the invention has been described with specific reference to the accompanying drawings, it is not to be limited save as defined in the appended claims.

I claim:

1. A dual axle suspension for vehicles comprising a frame, a pair of supporting axles for the frame, springs for suspending the frame on the axles, a transverse member disposed substantially parallel adjacent each of the axles, a rigid connection between the transverse member and the respective axle, a slidable coupling connecting the rigid connection and the transverse member, resilient joint means interposed between said slidable coupling and the rigid connection to permit limited angular displacement of the rigid connection with respect to said transverse member, and pressure-urging means acting on said slidable coupling tending to center the axle in relation to the frame.

2. A dual axle suspension for vehicles as set forth in claim 1 wherein the rigid connection is a yoke, the bifurcated end thereof being connected to the axle and the other end being connected to the transverse member.

3. A dual axle suspension for vehicles comprising a frame, a pair of supporting axles for the frame, fore-and-aft springs for suspending the frame on the axles, the forward ends of the springs of the front axle and the rearward ends of the springs of the back axle being connected to the frame, a transverse member substantially parallel to each axle, means for connecting the transverse member to the frame, a rigid connection between the transverse member and the respective axle, one end of the rigid connection being attached directly to the axle, the other end being slidably mounted on the transverse member, resilient joint means interposed between said slidable coupling and the rigid connection to permit limited angular displacement of the rigid connection with respect to said transverse member, and pressure-urging means carried by the transverse member to center the axle in relation to the frame.

4. A dual axle suspension for vehicles comprising a frame, a pair of supporting axles for the frame, fore-and-aft springs for suspending the frame on the axles, the forward ends of the springs of the front axle and the rearward ends of the springs of the back axle being connected to the frame, a pair of rotatable sprocket wheels mounted to each side of the frame, a rotatable sprocket wheel mounted to each side of the frame midway between the aforementioned sprocket wheels, a flexible chain on each side of the vehicle connecting the oppositely disposed free ends of the springs and engaging the undersides of the sprocket wheels and the upper side of the intermediate sprocket wheel, a transverse member supported adjacent each of the axles, a yoke connecting the transverse member and the axle, the bifurcated end of the yoke being connected directly to the axle, a rubber bushing connecting the other end of the yoke and the transverse member, the said other end being slidably mounted on the transverse member, and pressure-urging means carried by the transverse member to center the axle in relation to the frame.

References Cited in the file of this patent

UNITED STATES PATENTS

| 2,237,972 | Frazen | Apr. 8, 1941 |
| 2,272,572 | Merry | Feb. 10, 1942 |
| 2,417,690 | Keller | Mar. 18, 1947 |

FOREIGN PATENTS

| 608,243 | France | July 23, 1926 |
| 532,236 | Germany | Aug. 25, 1931 |